Patented Apr. 10, 1951

2,548,727

UNITED STATES PATENT OFFICE 2,548,727

PREPARATION OF NICKEL CARBONYL

John F. Kincaid, Mount Holly, N. J., and James S. Strong, Philadelphia, Pa., assignors to Rohm & Haas Company, Philadelphia, Pa., a corporation of Delaware No Drawing. Application January 22, 1948, Serial No. 3,818

9 Claims. (Cl. 23—203)

This invention relates to a process of preparing nickel carbonyl. More particularly, it relates to a process whereby compounds of nickel are rapidly converted to nickel carbonyl by the action of gases containing carbon monoxide under pressure.

It is known that metallic nickel in active form reacts with carbon monoxide to form nickel carbonyl. It is also known that aqueous solutions of a nickel salt to which an aqueous solution of alkali metal sulfide and an alkali metal hydroxide are added will slowly absorb carbon monoxide with the formation of nickel carbonyl. More recently it has been proposed to treat nickel sulfide with carbon monoxide under high pressure so as to simultaneously reduce the sulfide to metallic nickel and convert the metallic nickel to nickel carbonyl. These known processes have various disadvantages when the nickel to be converted to nickel carbonyl is in the form of a water-soluble salt.

Processes which utilize nickel carbonyl in the production of organic compounds leave residues from which the nickel can be readily recovered in the form of water-soluble nickel salts. It is highly desirable, therefore, that there be available an efficient and industrially practical method of converting these nickel salts back to nickel carbonyl. The object of this invention is to provide such a method. By it, almost quantitative yields of nickel carbonyl are rapidly obtained from water-soluble nickel salts in a single operation.

The invention is based upon the discovery that carbon monoxide under pressure reacts very rapidly with a slurry of freshly precipitated hydrated nickel oxide containing a small amount of a complex mixture of sulfur compounds which may be formed in situ by the addition of a suitable sulfur compound to the slurry. Better than 99% conversion of nickel to nickel carbonyl is obtainable in reaction times as low as one hour.

In carrying out the process a slurry of freshly precipitated hydrated nickel oxide containing an appropriate amount of the sulfur compound is first prepared. This may conveniently be done by mixing an aqueous solution of a water-soluble nickel salt and an aqueous solution of an alkali metal hydroxide or an aqueous suspension of an alkaline earth metal hydroxide, to which the sulfur compound has been added. Nickel chloride and sulfate are the preferred salts and sodium hydroxide is the preferred base. Other water-soluble nickel salts may be used and other alkali or alkaline earth hydroxides such as potassium or calcium hydroxide may be substituted for the sodium hydroxide. The concentration of the hydrated nickel oxide in the aqueous slurry may vary over a wide range, but the slurry should be sufficiently fluid to permit easy agitation. From one-tenth to one and one-half moles of hydrated nickel oxide per liter of slurry gives good results and about two-thirds mole per liter is preferred. If desired, a dispersing agent may be added to increase the fluidity of the slurry.

The sulfur compound incorporated in the slurry may be an alkali or alkaline earth sulfide or thiosulfate or a mixture of the two or a mixture that contains one or more of these and an alkali or alkaline earth sulfite. Even though an alkali metal sulfide alone is incorporated in the initial slurry, an analysis of the residue after reaction is complete shows that during the reaction a complex mixture of sulfur compounds is formed which contains not only sulfides but also sulfites and thiosulfates. This residue is a very effective accelerator for the reaction and may be used in subsequent runs. The evidence indicates that the sulfite ions and the thiosulfate ions as well as the sulfide ions play significant roles in the conversion. One mechanism, although possibly not the only one, which may explain the facts is the following:

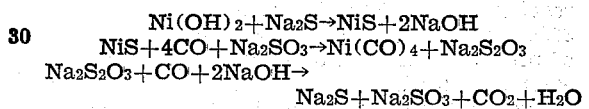

The alkali or alkaline earth sulfide or thiosulfate or a mixture as above-disclosed may be incorporated in the slurry either by adding it to one of the aqueous solutions or by mixing it into the prepared slurry. The amount added influences both the rate of reaction and the yield of nickel carbonyl. Amounts as low as two mole per cent based on the hydrated nickel oxide are effective. Increased amounts favor a more rapid reaction of the carbon monoxide and it is, therefore, preferable to use from 4 to 12 mole per cent. Higher amounts may also be used but without advantage, and quantities above 20 mole per cent seem to result in a lower rate of reaction and a lower yield of nickel carbonyl. Eight mole per cent of sodium sulfide appears to be optimum when pure nickel salts are used in the preparation of the hydrated nickel oxide. When an impure salt is used, such as the residual salts obtained from reacting nickel carbonyl with acetylene, alcohol and hydrochloric acid, better yields are obtained if part of the sodium sulfide is replaced by sodium sulfite or thiosulfate. With such salts a mixture of 4 mole per cent of sodium sulfide and from 2 to 6 mole per cent of sodium sulfite or thiosulfate gives better yields of nickel carbonyl than does sodium sulfide alone.

During the reaction with carbon monoxide the reaction mixture should at all times be kept alkaline. Usually this is accomplished by adding to the solution of nickel salt when making the hydrated nickel oxide the stoichiometric equivalent amount of alkali or alkaline earth hydroxide. If, however, acidic materials are present in the nickel salt, these should also be neutralized. It is sometimes desirable to add a slight excess of basic material to compensate for any acid substances that may be generated during the reaction. Usually the pH of the slurry at the start of the reaction should be above 10.0. During the reaction it should not drop below 7.5.

Another factor of considerable importance is that the reaction with carbon monoxide should be carried out on freshly prepared hydrated nickel oxide. If the slurry of precipitated oxide is allowed to stand, molecular changes seem to take place that result in both a slower rate of reaction and lower yields of nickel carbonyl.

The reaction may be conveniently carried out at a temperature of 100° C. and a pressure of 2000 pounds per square inch. At this temperature and pressure complete conversion of a 0.1 molar slurry of hydrated nickel oxide containing 0.008 mole of sodium sulfide can be accomplished in approximately one hour with a better than 99% recovery of the nickel as nickel carbonyl. At lower temperatures the rate of reaction is somewhat lower. At 60° C., for example, other conditions being the same, the reaction time was 4½ hours. At a temperature of 150° C. the reaction is approximately twice the rate at 100° C. A further increase in temperature does not produce as great an increase in rate of reaction, and very little advantage is gained by going above 200° C. While a pressure of 2000 pounds per square inch is a convenient one to use, lower pressures may be employed with some sacrifice in the rate of reaction. Pressures above 1000 pounds per square inch give practical rates of reaction, but it is better to operate at 1500 to 3000 pounds per square inch. The upper range of pressure is limited only by the limitations of equipment used.

The following examples illustrate the practice of the invention.

Example 1

A slurry containing 0.1 mole of hydrated nickel oxide and 0.008 mole of sodium sulfide (freshly prepared by reacting sodium hydroxide containing sodium sulfide and a purified nickel chloride) in 150 cc. of water was placed in a 500 cc. rocker bomb. Carbon monoxide under a pressure of 2000 pounds per square inch was added to the bomb. The bomb was heated to 100° C. and held at that temperature until there was no further drop in pressure. This point was reached in 70 minutes. The gases contained in the bomb were passed through a condenser to separate the nickel carbonyl from unreacted carbon monoxide. Analysis showed that 99.5% of the nickel had been converted to nickel carbonyl.

Example 2

The procedure of Example 1 was repeated except that water gas containing approximately 40% by volume of carbon monoxide was used and the total pressure in the bomb was raised to 3000 pounds per square inch. The reaction time was 75 minutes and 99.8% of the nickel was converted to nickel carbonyl.

Example 3

The nickel chloride solution that is obtained when acetylene is reacted with nickel carbonyl, ethyl alcohol, and hydrochloric acid to form ethyl acrylate was used in the preparation of a slurry containing 0.1 mole of hydrated nickel oxide, 0.008 mole of nickel sulfide, and 150 cc. of water. A solution of 0.2 mole of sodium hydroxide and 0.008 mole of sodium sulfide was used in the preparation of the slurry. The pH of the slurry was 11.2. It was placed in a 500 cc. rocker bomb and carbon monoxide at a pressure of 2000 pounds per square inch was added. The bomb was heated to 100° C. After 73 minutes there was no further drop in pressure. Analysis of the contents of the bomb showed that the pH at the finish of the reaction was 8.4 and that 94.9% of the nickel had been converted to nickel carbonyl.

Example 4

The procedure of Example 3 was repeated with the modification that 0.004 mole of nickel sulfide catalyst was used instead of 0.008 mole. The pH at the start of the reaction was 11.1 and at the finish 7.5. It required two hours and thirty minutes for the reaction to go to completion and resulted in a 99.2% conversion of nickel to nickel carbonyl.

Example 5

The procedure of Example 3 was repeated with the modification that a mixture of 0.004 mole of sodium sulfide and 0.004 mole of sodium thiosulfate was used as catalyst in place of the 0.008 mole of sodium sulfide. The pH at the start of the reaction was 11.2 and at the finish was 8.5. Reaction was complete in 45 minutes, and there was obtained a 99.4% conversion of nickel to nickel carbonyl.

Example 6

The procedure of Example 3 was repeated with the modification that a mixture of 0.004 mole of sodium sulfide and 0.004 mole of sodium sulfite was used as catalyst in place of the 0.008 mole of sodium sulfide. The pH at the start of the reaction was 13.1 and at the finish 8.4. Reaction was complete in 50 minutes, and there was obtained a 97.2% conversion of nickel to nickel carbonyl.

Example 7

The procedure of Example 3 was repeated with the modification that in place of 0.2 mole of sodium hydroxide, 0.135 mole of calcium oxide was used together with 0.004 mole of sodium sulfide and 0.004 mole of sodium thiosulfate. The pH at the start of the reaction was 11.6. Reaction was complete after 75 minutes, and there was obtained a 99.3% conversion of nickel to nickel carbonyl.

The above examples illustrate the invention as it may be carried out in batch operations. Other apparatus capable of insuring good dispersion of the carbon monoxide in the slurry of hydrated nickel oxide may also be used and, with suitable equipment such as is used in reactions between gases and liquid materials, the process may be carried out in a continuous or semi-continuous manner. To insure the freshness of the hydrated nickel oxide slurry, it is desirable that the solution of nickel salt and alkali metal hydroxide be mixed in the reactor. This may be conveniently done in a continuous process by means of a vertical column wherein the two solutions, one of which contains the catalyst, are added to the column and carbon monoxide is continuously circulated upwardly through the column, then through a condenser to separate the nickel carbonyl, and then back to the bottom of the column. The rate of flow of the carbon monoxide may be adjusted to give good dispersion in the slurry, and this may be aided by suitable baffles placed in the column. Spent liquid is withdrawn at the top of the column.

In place of adding an alkali or alkaline earth sulfide to the solution of alkali or alkaline earth hydroxide or water-soluble nickel salt or to the slurry of hydrated nickel oxide, sulfur compounds may be formed in situ by the addition of a different water-soluble, ionizable sulfide to one or the other of these preparations. In the final mixture equilibrium conditions are established between the various ions and ionizable materials that are present and, therefore, in the presence of the alkali or alkaline earth ions contributed by their hydroxide, any water-soluble, ionizable sulfide may be used to contribute the sulfide ions. Similarly, other water-soluble ionizable sulfites or thiosulfates may be used in place of the alkali or alkaline earth sulfides or thiosulfates.

We claim:

1. The process of making nickel carbonyl wherein a fluid aqueous slurry of a freshly precipitated hydrated nickel oxide prepared by mixing in water a water-soluble nickel salt, a member of the group consisting of alkali and alkaline earth hydroxides and from 4 to 12 mole per cent, based on the nickel salt, of at least one member from the group consisting of water-soluble sulfides and water-soluble thiosulfates is reacted with carbon monoxide under a pressure in excess of 1000 pounds per square inch under alkaline conditions and at a temperature of from 60° to 200° C.

2. The process of making nickel carbonyl wherein a fluid aqueous slurry of a freshly precipitated hydrated nickel oxide prepared by mixing in water a water-soluble nickel salt, a member of the group consisting of alkali and alkaline earth hydroxides and from 4 to 12 mole per cent, based on the nickel salt, of at least one member from the group consisting of water-soluble sulfides and water-soluble thiosulfates is reacted with carbon monoxide under a pressure of from 1500 to 3000 pounds per square inch under alkaline conditions and at a temperature of from 60° to 200° C.

3. The process of making nickel carbonyl wherein an alkaline fluid aqueous slurry of a freshly precipitated hydrated nickel oxide, prepared by mixing in water a water-soluble nickel salt, a member of the group consisting of alkali and alkaline earth hydroxides and from 4 to 12 mole per cent based on the nickel salt of a water-soluble sulfide and a water-soluble thiosulfate, is heated to from 60° to 200° C. and brought into intimate contact with carbon monoxide under a pressure in excess of 1000 pounds per square inch, said slurry being maintained at an alkaline pH of at least 7.5.

4. The process of making nickel carbonyl wherein an alkaline fluid aqueous slurry of a freshly precipitated hydrated nickel oxide, prepared by mixing in water a water-soluble nickel salt, a member of the group consisting of alkali and alkaline earth hydroxides, a water-soluble sulfite and from 4 to 12 mole per cent based on the nickel salt of a water-soluble sulfide is heated to from 60° to 200° C. and brought into intimate contact with carbon monoxide under a pressure in excess of 1000 pounds per square inch, said slurry being maintained at an alkaline pH of at least 7.5.

5. The process of making nickel carbonyl which comprises bringing carbon monoxide into intimate contact at a temperature of from 60° to 200° C. and under a pressure of 1500 to 3000 pounds per square inch with an alkaline fluid aqueous slurry of a freshly precipitated hydrated nickel oxide, which slurry is prepared by mixing in water a water-soluble nickel salt and a member of the group consisting of alkali and alkaline earth hydroxides and which is maintained at an alkaline pH of at least 7.5 and which contains the sulfur compounds resulting from the addition to the slurry of 4 to 12 mole per cent, based on the nickel salt, of at least one member from the group consisting of water-soluble sulfides and water-soluble thiosulfates.

6. The process of claim 5 wherein the sulfur compounds are at least in part the sulfur compounds contained in the residue from a previous run of said process.

7. The process of making nickel carbonyl which comprises passing a fluid aqueous slurry of hydrated nickel oxide, freshly prepared by mixing an aqueous solution of a water-soluble nickel salt with the stoichiometric equivalent of aqueous alkali metal hydroxide and with 4 to 12 mole per cent, based on the nickel salt, of at least one member from the group consisting of water-soluble sulfides and water-soluble thiosulfates, through a vertical, heated column, passing carbon monoxide under a pressure in excess of 1000 pounds per square inch upwardly through said column in intimate contact with said slurry which is maintained at an alkaline pH of at least 7.5 and withdrawing both liquid and gaseous products from said column.

8. The process of making nickel carbonyl which comprises passing a fluid aqueous slurry of hydrated nickel oxide, freshly prepared by mixing an aqueous solution of nickel chloride with the stoichiometric equivalent of aqueous alkali metal hydroxide and with 4 to 12 mole per cent of an alkali-metal sulfide based on the hydrated nickel oxide, upwardly through a vertical column heated to a temperature of from 60° to 200° C., passing carbon monoxide under a pressure of from 1500 to 2000 pounds per square inch upwardly through said column in intimate contact with said slurry which is maintained at an alkaline pH of at least 7.5, withdrawing both liquid and gaseous products from the top of said column, passing the gases through a condenser to liquefy the nickel carbonyl, and recycling unreacted carbon monoxide through said column.

9. The process of making nickel carbonyl which comprises passing a fluid aqueous slurry of hydrated nickel oxide, freshly prepared by mixing an aqueous solution of nickel chloride with the stoichiometric equivalent of aqueous alkali metal hydroxide and with 4 to 12 mole per cent based on the hydrated nickel oxide of a mixture of alkali metal sulfide and alkali metal thiosulfate, upwardly through a vertical column heated to a temperature of from 60° to 200° C., passing carbon monoxide under a pressure of from 1500 to 2000 pounds per square inch upwardly through said column in intimate contact with said slurry which is maintained at an alkaline pH of at least 7.5, withdrawing both liquid and gaseous products from the top of said column, passing the gases through a condenser to liquefy the nickel carbonyl, and recycling unreacted carbon monoxide through said column.

JOHN F. KINCAID.
JAMES S. STRONG.

REFERENCES CITED

The following references are of record in the file of this patent:

UNITED STATES PATENTS

| Number | Name | Date |
|---|---|---|
| 1,909,762 | Grieb | May 16, 1933 |
| 1,944,849 | Schlecht | Jan. 23, 1934 |

FOREIGN PATENTS

| Number | Country | Date |
|---|---|---|
| 327,956 | Great Britain | Apr. 14, 1930 |